(12) United States Patent
Zinner

(10) Patent No.: US 11,902,048 B2
(45) Date of Patent: Feb. 13, 2024

(54) CONTROL UNIT ARCHITECTURE FOR VEHICLES

(71) Applicant: Continental Automotive GmbH, Hannover (DE)

(72) Inventor: Helge Zinner, Frankfurt am Main (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 282 days.

(21) Appl. No.: 17/291,140

(22) PCT Filed: Nov. 11, 2019

(86) PCT No.: PCT/EP2019/080819
§ 371 (c)(1),
(2) Date: May 4, 2021

(87) PCT Pub. No.: WO2020/099298
PCT Pub. Date: May 22, 2020

(65) Prior Publication Data
US 2021/0392012 A1 Dec. 16, 2021

(30) Foreign Application Priority Data
Nov. 12, 2018 (DE) ..................... 10 2018 219 246.4

(51) Int. Cl.
*H04L 12/40* (2006.01)
*G06F 30/34* (2020.01)
(52) U.S. Cl.
CPC ........ *H04L 12/40078* (2013.01); *G06F 30/34* (2020.01); *H04L 2012/40273* (2013.01)
(58) Field of Classification Search
CPC ..... H04L 12/40078; H04L 2012/40273; G06F 30/34
See application file for complete search history.

(56) References Cited

U.S. PATENT DOCUMENTS 8,917,741 B2 * 12/2014 Beecroft ............. H04L 49/3045
370/414
9,479,436 B2 10/2016 Oskouy et al.
(Continued)

FOREIGN PATENT DOCUMENTS

CN 102090030 A 6/2011
CN 105120496 B * 6/2019 ............ H04W 28/08
(Continued)

OTHER PUBLICATIONS

English Translation of CN-105120496-B (Year: 2019).*
International Search Report and Written Opinion for International Application No. PCT/EP2019/080819, dated Jan. 28, 2020, with partial English translation, 10 pages.
International Search Report and Written Opinion for International Application No. PCT/EP2019/080819, dated Jan. 28, 2020, 17 pages (German).
(Continued)

*Primary Examiner* — Henry Tsai
*Assistant Examiner* — John B Roche
(74) *Attorney, Agent, or Firm* — RatnerPrestia

(57) ABSTRACT

A control unit architecture and a method in which a communication connection takes place between at least two control units, in particular in a vehicle. The method includes receiving the data packet by the first interface controller; determining, by a data analyzer, a transmission strategy for the data packet, the transmission strategy including at least one of the following actions: rejecting the data packet, and/or sending the data packet to at least one of the second interface controllers, and/or sending the data packet to at least one of the buffer stores, and/or fragmenting the data packet and sending it to at least one of the buffer stores, and/or sending the content of the at least one buffer store to at least one of the second interface controllers; implementing the transmission strategy for the data packet.

20 Claims, 9 Drawing Sheets

(56) References Cited

U.S. PATENT DOCUMENTS

| | | | |
|---|---|---|---|
| 2002/0118640 A1* | 8/2002 | Oberman | H04L 49/25 370/389 |
| 2005/0219564 A1* | 10/2005 | Arai | H04L 25/4902 358/1.9 |
| 2008/0028112 A1* | 1/2008 | Kubo | G06F 13/4081 710/104 |
| 2013/0201984 A1 | 8/2013 | Wang | |
| 2016/0033965 A1* | 2/2016 | Kopetz | H04L 12/40182 701/23 |
| 2016/0182341 A1* | 6/2016 | Fischer | B60W 50/0205 370/251 |

FOREIGN PATENT DOCUMENTS

| | | |
|---|---|---|
| JP | 2018148494 A | 9/2018 |
| WO | 2015028342 A1 | 3/2015 |

OTHER PUBLICATIONS

German Examination Report for German Application No. 10 2018 219 246.4, dated Jun. 27, 2019, 7 pages.

Anonymous: "iptables(8)—Linux man page," Feb. 3, 2018, 34 pages, Retrieved from the Internet: https://web.archive.org/web/20180203003429/https://linux.die.net/man/8/iptables [retrieved on Jan. 13, 2020], XP055657344.

German Examination Report for German Application No. 10 2018 219 246.4, dated Oct. 11, 2021, with translation, 10 pages.

Chinese Office Action for Chinese Application No. 201980073954.6, dated Jun. 1, 2023 with translation, 13 pages.

European Communication pursuantto Article 94(3) for European Application No. 19 801 860.8, dated Jun. 9, 2023 with translation, 9 pages.

Chinese Office Action for Chinese Application No. 201980073954.6, dated Nov. 9, 2023 with translation, 11 pages.

* cited by examiner

CONTROL UNIT ARCHITECTURE FOR VEHICLES

CROSS REFERENCE TO RELATED APPLICATIONS

This application is the U.S. National Phase Application of PCT International Application No. PCT/EP2019/080819, filed Nov. 11, 2019, which claims priority to German Patent Application No. 10 2018 219 246.4, filed Nov. 12, 2018, the contents of such applications being incorporated by reference herein.

FIELD OF THE INVENTION

The invention relates to a control unit architecture in which a communication connection takes place between at least two control units, in particular in a vehicle. The invention furthermore relates to a method for transmitting data packets and to a use.

BACKGROUND OF THE INVENTION

Control units in a vehicle have an increasing need for communication. One of the reasons for this is that the number of control units in vehicles is continuously increasing. At least in some vehicles, this means that existing transmission media, such as field buses, no longer have the required bandwidth and are therefore increasingly being supplemented by other, sometimes faster, communication connections, transmission media and/or transmission protocols. In many cases, the existing transmission media are supposed to continue being used, for example for reasons of security or in order to be able to continue using existing methods and/or devices, for example for testing and/or debugging.

SUMMARY OF THE INVENTION

An aspect of the invention is to provide a method and/or a control unit architecture that enables control units having existing transmission media to be connected to other transmission media and transmission protocols.

One aspect of the invention relates to a method for transmitting a data packet from a first interface controller to at least one second interface controller, comprising the steps of:
  receiving the data packet by means of the first interface controller;
  determining, by means of a data analyzer, a transmission strategy for the data packet, the transmission strategy comprising at least one of the following actions:
  rejecting the data packet, and/or
  sending the data packet to at least one of the second interface controllers, and/or
  sending the data packet to a buffer store, and/or
  fragmenting the data packet and sending it to at least one buffer store, and/or
  sending the at least one buffer store, or the content thereof, to at least one of the second interface controllers;
  implementing the transmission strategy for the data packet.

The first and second interface controllers are arranged in a vehicle. The vehicle is, for example, a motor vehicle, such as a car, a bus or a truck, or else also a rail vehicle, a ship, an aircraft, such as a helicopter or an airplane.

The first interface controller can be connected, for example, to a communication connection or to a transmission medium. The communication connection can, for example, use wireless and/or wired transmission protocols, for example Ethernet protocols, LTE protocols (Long-Term-Evolution and/or Long-Term-Evolution-Advanced) and/or so-called 5G protocols. These protocols involve the data to be transmitted being split into data packets having a fixed or variable length. The first interface controller is set up to receive such a data packet. The data packet can be stored, in particular stored temporarily, for example in a receive buffer.

The data packet is transmitted to at least one second interface controller. There is the possibility of not every data packet being transmitted to exactly one second interface controller. For example, some of the data packets can be rejected. Some of the data packets can be transmitted to more than one second interface controller, for example; this can also be referred to as multicast or broadcast. The second interface controller can use the same protocol as the first interface controller. It can also use the same type of protocol as the first interface controller, but a different speed; for example, the first interface controller can use a 1000BASE-T1 protocol and the second interface controller 100BASE-T1. The second interface controller can also use a "traditional" vehicle bus, such as a CAN bus or one of its successors. The use of a "traditional" vehicle bus can be particularly advantageous because it may thus also be possible to use components that have been developed and/or manufactured for these "traditional" vehicle buses, and to connect these components to newer and/or faster communication connections.

The data packet is analyzed by means of a data analyzer. For example, the header, length and/or content of the data packet and/or the frequency of the data stream, i.e. the number of packets per unit time, can be analyzed. Information from multiple protocol layers can be used, for example an MAC address and/or the number of a virtual channel, as used by specific protocols. The data packet can also be assigned to a specific type of data. Examples of a data type can be: control information for the vehicle and/or an actuator, control information for a device such as a telephone, raw sensor data, infotainment data, audio data, video data. When analyzing the data packet, the data flow on the communication connection of the first interface controller can also be taken into account, for example the utilization level of the communication connection.

The transmission strategy for the data packet is determined from the analysis of the data packet. The transmission strategy can include one or more actions. The actions can be performed as a single action, as a parallel action and/or as a serial action. The performance of an action can be dependent on the performance of another action. The action can relate to the same data packet or also include other data packets, for example data packets that have already been stored, for example in a buffer store.

One of the actions can be to reject the data packet. This can happen, for example, if the first interface controller has or is threatened with a buffer overflow. Rejection can also be carried out depending on the data type. For example, all data packets that come from a device with an unknown MAC address can be rejected. For example, a maximum number of packets per unit time can also be defined for a specific data type, and all packets that exceed the maximum number can be rejected. The maximum number can also be defined depending on a specific sender. These actions can advantageously be used to fend off certain types of DoS attacks (DoS: Denial of Service), for example. This is particularly advantageous in vehicles because control units in the vehicle electrical system can have limited, some even very limited, resources—for example with regard to memory and/or processing power.

One of the actions can be to send the data packet to at least one of the second interface controllers. This can be done, for example, if the transmission latency is to be minimized. Sending can take place, for example, without further treatment of the data packet. If, for example, it is necessary for the incoming data to arrive with a high level of security, then for example all filters can be deactivated and rapid forwarding can be made possible. This state could be adopted on the basis of the configuration or also on the basis of the received data (for example special transport protocols that require real time).

Sending to at least one of the second interface controllers can, for example, depend on the data type of the data packet. Other properties can also be derived from the data packet and/or assigned to the data packet. An example can be a priority that the data packet has, for example in part of the header, or that is assigned to the data packet, for example on the basis of its data type. For example, sensor data can be assigned a higher priority than music data, for example.

Sending to at least one of the second interface controllers can include sending to a predefined set of second interface controllers or sending to all second interface controllers; this can also be referred to as multicast or broadcast. This can emulate protocols of the first interface controller that support multicast or broadcast.

One of the actions can be to send the data packet to at least one of the buffer stores. This can be done, for example, in order to collect the data of multiple data packets—and send them to one of the second interface controllers only collectively—and thus to reduce the data traffic to the selected second interface controller.

One of the actions can be to fragment the data packet and to send the fragmented data packet to at least one buffer store. In this way, for example, large data packets that exceed the protocol and/or the input buffers of the second interface controllers can be sent to the corresponding devices without these devices having to make design changes. This enables devices that have already been extensively tested and/or that have proven themselves for this vehicle and/or for other vehicles to be used and/or to continue to be used in later generations of a vehicle without a great deal of adaptation effort.

One of the actions can be to send the at least one buffer store to at least one of the second interface controllers. This can be done, for example, after the fragmentation and/or the collection of data in this buffer store. This can include a multicast or a broadcast to multiple second interface controllers. In this way, for example, parallel processing of data can be realized. This is particularly advantageous if more powerful controllers are not available or if more powerful controllers require more power and/or would give off more heat than the parallelized solution. It is also possible for multiple data streams to be combined, i.e. if, for example, an overload is "suspected" then a multicast stream can be generated and/or the data can be forwarded to the second controller—as it were "for security".

After the transmission strategy has been determined, the transmission strategy for the data packet is implemented.

This method can thus realize an apparatus for "connection" upstream of "standard" control units—for example control units that were used in the last generation of vehicles. This is also advantageous if the interfaces of the microcontrollers change. The second interface controller can thus have further hardware connected upstream of it that can process the Ethernet traffic and/or relieve the controller of load. Furthermore, it is thus possible to decouple the second interface controllers from the first interface controllers. This can be used, for example, to reduce the number of interrupts and/or the protocol overhead for the second interface controllers. The numerous interrupts were able to have the effect, at least in the case of some control units, that the control units' CPU is informed of every incoming frame and tasks in progress could thus be interrupted. This could sometimes lead to Ethernet frames being rejected and/or paused tasks not being able to be processed in a timely manner. Avoiding this is particularly advantageous in regard to a vehicle electrical system for transporting safety-critical data. This can also allow the vehicle electrical system communication to be configured dynamically, for example also in those systems in which the vehicle electrical system communication was previously configured statically for reasons of safety, i.e. functional safety. This can also apply to multicast and broadcast communication.

Another aspect of the invention relates to a method for transmitting a data packet from at least one second interface controller to a first interface controller, comprising the steps of:
  receiving the data packet by means of the second interface controller;
  determining, by means of a data analyzer, a transmission strategy for the data packet, the transmission strategy comprising at least one of the following actions:
  rejecting the data packet (500), and/or
  sending the data packet (500) to the first interface controller (110), and/or
  sending the data packet (500) to at least one of the buffer stores (131, 132), and/or
  fragmenting the data packet (500) and sending it to at least one of the buffer stores (131, 132), and/or
  sending the content of the at least one buffer store (131, 132) to the first interface controller (110);
  implementing the transmission strategy for the data packet.

The transmission of a data packet from at least one second interface controller to a first interface controller can also be understood as an "inverse operation" with respect to the transmission of a data packet from a first interface controller to at least one second interface controller. These two operations can be combined with one another in such a way that they can be viewed as complementary and/or bidirectional operations. Similar considerations to those explained above therefore also apply to the determination and/or implementation of the transmission strategy.

In one embodiment, the transmission strategy furthermore comprises at least one of the following actions:
  using a characterization for the data packet. The characterization can comprise the determination of a data type.
  using an assignment to one of the buffer stores and/or to one of the second interface controllers for the data packet. This can be advantageous, for example, when video data and telephone data, for example, are supposed to be quickly sorted and assigned to the applicable devices.
  using a whitelist for the data packet. A whitelist lists, for example, MAC addresses of devices that are supposed to transmit. All other data are rejected and thus reduce the risk of intrusion by unauthorized addresses, in particular in regard to the security of the devices.

using a priority for the data packet. The priority can be allocated depending on the type of the data. The priority of the data can influence actions; for example, the buffer can be cleared of data having higher priority more quickly or data having higher priority cannot use buffers, for example.

using a maximum load for the data packet. The maximum load can be the load on the communication connection of the first interface controller and/or the second interface controller. The maximum load can, for example, also be defined as a maximum number of packets per unit time for a specific data type, and all packets that exceed the maximum number can be rejected. The maximum number can also be defined depending on a specific sender.

In one embodiment, at least part of the transmission strategy is presented in a table. The table can comprise, for example: the characterization for the data packet, assignment to one of the buffer stores and/or to one of the second interface controllers, elements of a whitelist for the data packet, the priority for the data packet, the maximum load for the data packet. The use of the table can make the method less susceptible to error. In addition, the table enables dynamic configuration, either when setting up the vehicle and/or during an update and/or by means of a configuration file.

In one embodiment, the table is formed as an associative memory. The characterization can be used as a key for the associative memory. Other keys can also be used, for example composite keys or just a part of the characterization. An associative memory can enable the transmission strategy to be determined more quickly.

In one embodiment, the transmission strategy furthermore comprises the following action:
reading in the table from a configuration module.

This allows the transmission strategy to be changed easily and quickly, or when setting up or updating the vehicle.

In one embodiment, the transmission strategy furthermore comprises the following action:
sending at least part of the data packet to a logging module.

This advantageously allows the security of the communication to be increased further. In particular, it can be used to determine and/or understand at least certain forms of attacks.

In one embodiment, the first interface controller supports an Ethernet protocol and the second interface controller supports a parallel bus protocol, a serial bus protocol and/or an Ethernet protocol.

This allows broad applicability, for example to various communication connections, transmission media and/or transmission protocols, to be achieved.

In one embodiment, the method furthermore comprises a further first interface controller, the further first interface controller supporting the same protocol as the first interface controller. This can be used to increase performance and/or reliability in particular in the case of communication connections with a bus topology, for example Ethernet.

In one embodiment, the further first interface controller is used as redundant first interface controller. In particular in the case of communication connections with bus topology, the same datum can thus be read multiple times—for example twice—by means of multiple first interface controllers. This can be used, for example, to put in place a redundancy strategy. The redundancy strategy can include, for example, reciprocal checking of the data read in, for example by comparing the data, shutdown of faulty controllers and other redundancy strategies.

Another aspect of the invention relates to a control unit for transmitting a data packet from a first interface controller to at least one second interface controller and/or for transmitting a data packet from at least one second interface controller to a first interface controller, the control unit having:
a first interface controller,
a data analyzer,
at least one buffer store, and
at least one second interface controller.

The control unit is set up to carry out a method as explained above and/or in the examples.

The control unit has a series of advantages. A change to new microcontrollers is possible without major changes due to an introduction of Ethernet modules into the vehicle. At least some platform developments can be continued despite the lack of original protocol support, since only the control unit, as further hardware, needs to be connected upstream of the controller. The upstream Ethernet hardware can adapt the communication data on the basis of the data received from the microcontroller. Adapting in this context means, among other things, duplicating, eliminating, changing addresses and/or checking.

In particular, a gain in performance, but also a gain in functionality, through the use of Ethernet-based communication can be used. For example, some Ethernet-based protocols can achieve a transmission rate of 100 Mbit/s, for example, compared to, for example, a transmission rate of 0.5 Mbit on the CAN bus. The control unit can also be used if, for example, sensors such as cameras and radar send uncompressed data. The control unit and/or the outlined method can require appreciably fewer hardware resources and can therefore be put into effect with existing implementations if necessary. Furthermore, the level of security can be significantly increased in this way; in some embodiments this can be done without this leading to higher manufacturing costs for the network or for devices connected thereto. Another advantage of this control unit is also that existing hardware does not have to be changed, but rather the existing hardware can continue to be used. In some embodiments, the control unit and/or the method can be integrated into an existing network without existing devices being damaged.

The invention can advantageously increase the quality of the execution of software-based applications, for example in the case of an at least partially automated vehicle, in particular with better protection with regard to safety and security. The network system according to the invention is improved in terms of costs and reliability. Integrating the Ethernet HW in the ECU can furthermore increase the fail-safety of the systems. In an advantageous manner, the invention can significantly and very simply increase the security of a vehicle network, in particular with reduced additional financial outlay. Earlier detection of attacks and abnormal behavior by means of the early analysis allows gaps and errors to be identified before the vehicle is delivered. The invention also provides a transparent security functionality.

Another advantage of this invention is that the usual hardware does not have to be changed, but rather the existing hardware can continue to be used. This can lead to largely platform-independent solutions. This also allows at least partial compatibility with new protocols such as AVB (Audio Video Bridging) and TSN (Time Sensitive Networking) to be achieved. The method can be integrated into an existing network without damaging existing devices.

In one embodiment, the control unit is implemented as an Application-Specific Integrated Circuit (ASIC) or as a Field Programmable Gate Arrays (FPGA). This makes it possible to combine the control unit with existing hardware, for example, without requiring a large amount of space, and thus to expand the range of applications easily and inexpensively.

Another aspect of the invention relates to a control system for transmitting a data packet from a first interface controller to at least one second interface controller and/or for transmitting a data packet from at least one second interface controller to a first interface controller, the control system having:
- a control unit as described above,
- a configuration module, wherein the control unit is set up to read in a table from the configuration module, and/or
- a logging module, wherein the control unit is set up to send at least part of the data packet to the logging module.

Another aspect of the invention relates to the use of a method, a control unit or a control system as described above and/or in the figures for transmitting a data packet between controller modules in a vehicle.

Another aspect of the invention relates to a vehicle having a control unit or a control system as described above and/or in the figures.

The invention can be used outside a vehicle, for example in the field of embedded systems. High security requirements, low processing power and slow platform cycles are examples of such areas of application.

In one embodiment, the hardware for a function that provides filter functions can be defined. In this regard, the filters (e.g. data parameters, unit of time, validity period) are transferred to the hardware and actions that should take effect if the filter is violated are defined, such as rejection of the data, rejection of all data from the problem onwards, storage of the data, etc.

In one embodiment, the invention has functions for merging or duplicating data. In this instance, the controller reports to the system data stream patterns (IDs) on the basis of which fusion, elimination or duplication is supposed to take place.

In one embodiment, the messages (packets) can be dynamically adapted to suit the requirements/capacities of the controller. For example, the maximum current packet size can be determined by the controller. The packet size and the frequency of the data ultimately determine the resulting interrupt load on the controller. On the basis of this knowledge, the package size is then adapted for the requirement in the unit. If, for example, very large jumbo frames of, for example, more than 1500 bytes arrive, or very small frames of, for example, 64 bytes or less, then the circuit can adaptively reassemble or split. This can comprise the following steps:
- checking the resource capacity in the controller (with regard to security test, processing speed, memory, etc.);
- transmitting the parameters to the additional hardware;
- checking whether incoming data comply with these rules;
- processing the data according to the requirements;
- (optionally) feedback on actions carried out to the controller.

In one embodiment, the hardware can be set so that it is used only from a predefined permissible latency onwards.

In one embodiment, the hardware can be activated automatically if, for example, security protocols are recognized or requirements are recognized (header analysis of the Ethernet hardware). The hardware can possibly act autonomously in this instance and work with filters that are predefined for these protocols. Feedback regarding activation can then be given to the controller via the separate control channel.

In one embodiment, the hardware can react to changes in the data load and can also report this back via the control channel. If the load per unit time increases, a slow and preparatory response can be provided and this can additionally be reported to the controller.

BRIEF DESCRIPTION OF THE DRAWINGS

For further clarification, aspects of the invention will now be described on the basis of embodiments shown in the figures. These embodiments are intended to be understood merely as examples and not as limitations.

In the figures.

DETAILED DESCRIPTION OF THE PREFERRED EMBODIMENTS

Figure 1:
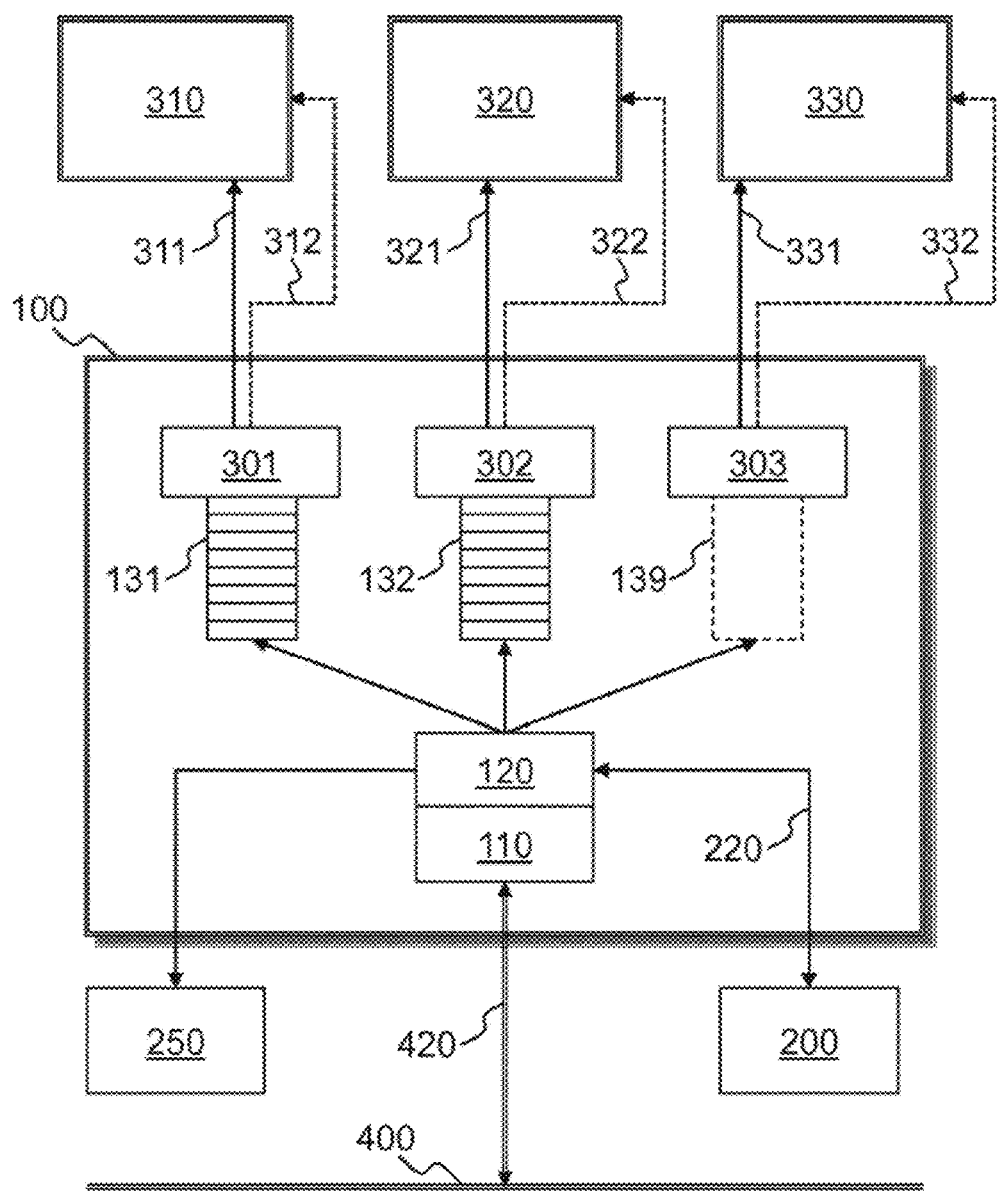
FIG. 1: shows a schematic depiction of a control unit according to an embodiment of the present invention.

FIG. 1 shows a schematic depiction of a control unit 100 according to an embodiment of the present invention. The control unit 100 has a first interface controller 110 that is connected to an Ethernet connection 420. The Ethernet connection 420 is connected to an Ethernet line 400. The Ethernet line 400 can be part of a vehicle communication system. The first interface controller 110 is connected to a data analyzer 120 that is set up to determine a transmission strategy for a data packet 500 (see FIG. 3). The transmission strategy can comprise, for example, the data packet 500 being rejected. This can be the case, for example, in the event of overload on the Ethernet connection 400, 420 or if the data packet 500 is not approved for the first interface controller 110, for example on the basis of a whitelist of the MAC addresses. In this embodiment, the data analyzer 120 is connected to a configuration module 200. The configuration module 200 can configure the data analyzer 120 via the interface 220. The data analyzer 120 can also send data to the configuration module 200; this can comprise, for example, a simple "acknowledge" for reception of the data, but also data that support the reconfiguration of the data analyzer 120. The data analyzer 120 is furthermore connected to a logging module 250 that records at least parts of the data packets 500. This can be used, for example, to discover security-relevant scenarios.

Depending on parts of the data packet 500, the data packet 500 can be sent directly to a vehicle controller 330, for example. This is indicated by the buffer store 139 shown in dashed lines; this buffer store 139 can either be very small (for example contain only one entry) or can also be omitted, so that a direct and thus fast transmission to the second interface controller 303 can take place. Depending on parts of the data packet 500, the data packet 500 can be sent to the buffer store 131 and/or 132, for example. If the data packet 500 is sent to more than one buffer store, this can be the realization of a multicast or a broadcast. The buffer store(s) 131, 132 can be sent to one of the vehicle controllers 310, 320, 330 via one of the second interface controllers 301, 302, 303. FIG. 1 depicts a direct assignment of the second interface controllers 301, 302, 303 to the vehicle controllers 310, 320, 330. In another embodiment, a different assignment can be implemented, for example the second interface controller 302 can send both to the vehicle controller 310 and to the vehicle controller 320 (not depicted). In another embodiment, for example, the vehicle controller 330 can receive data from the two second interface controllers 301 and 302 (not depicted). The connection between the second interface controllers 301, 302, 303 and the vehicle controllers 310, 320, 330 comprises the data connections 311, 321, 331 and the interrupt connections 312, 322, 332, respectively. This depends on the choice of connection protocol between the second interface controllers and the vehicle controllers. With some protocols, the interrupt connections can be dispensed with.

Figure 2:
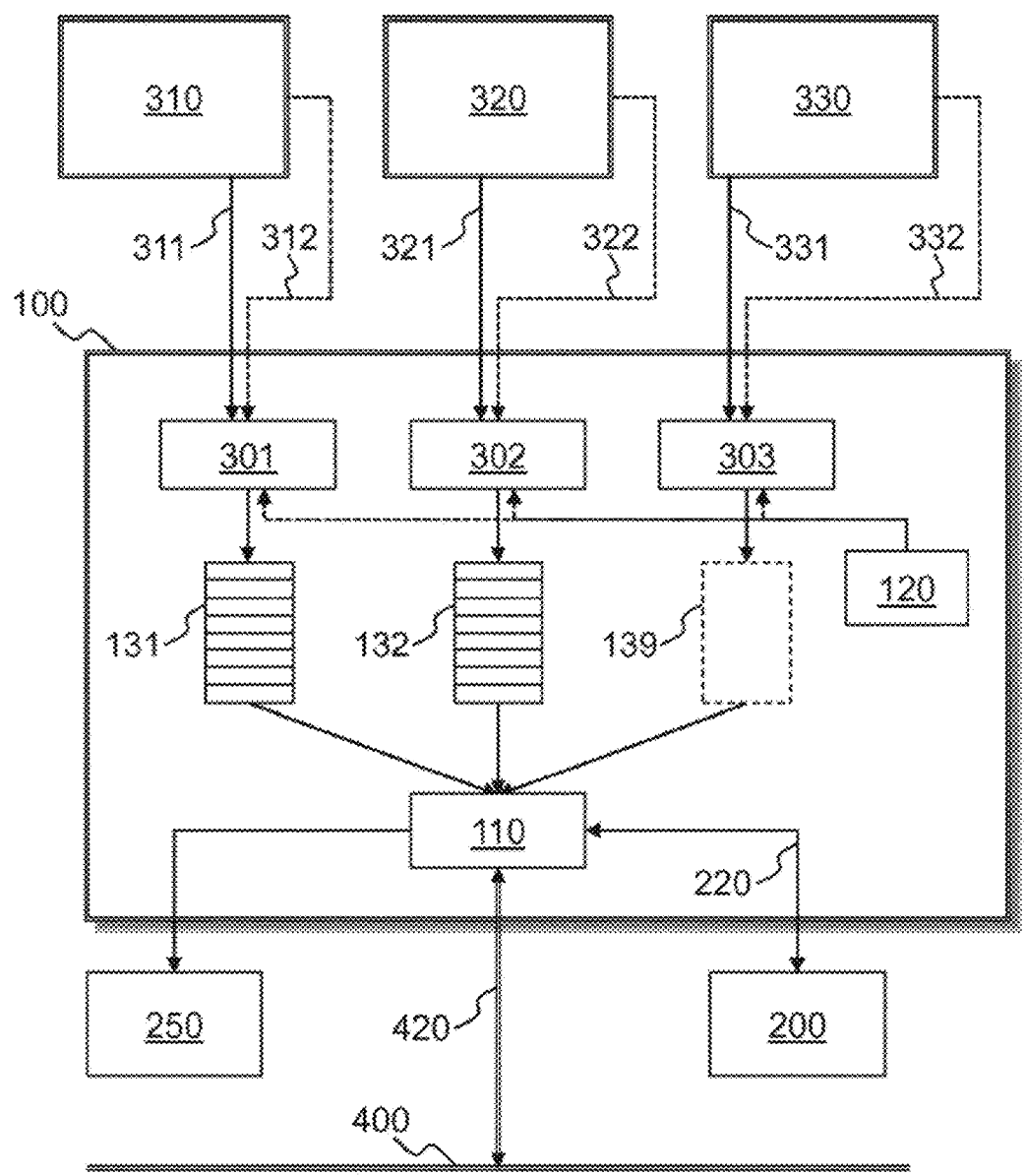
FIG. 2: shows a schematic depiction of a control unit according to a further embodiment of the present invention.

FIG. 2 shows a schematic depiction of a control unit 100 according to a further embodiment of the present invention. Components having the same reference signs as in FIG. 1 have the same or an analogous function. For example, the buffer stores 131, 132 send in the opposite direction to in FIG. 1. This embodiment shown in FIG. 2 can be used, for example, to send data from one of the vehicle controllers 310, 320, 330 to the Ethernet connection 420. In contrast to FIG. 1, the data analyzer 120 in this embodiment controls and/or influences not the first interface controller 110 but rather the second interface controllers 301, 302, 303. In another embodiment, the data analyzer 120 can control multiple instances of the components of the control unit 100, for example also the first interface controller 110.

Figures 3, 4:
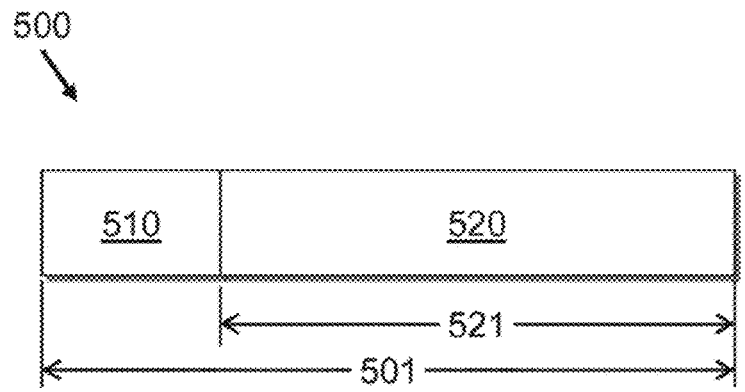
FIG. 3: shows a schematic depiction of a data packet according to a further embodiment of the present invention.
FIG. 4: shows a schematic depiction of part of a table according to a further embodiment of the present invention.

FIG. 3 shows a schematic depiction of a data packet 500 according to a further embodiment of the present invention. The header 510 and the data part 520 of the data packet 500 are clearly discernible. The data packet 500 has an overall length 501. The data part 520 has a data length 521. The transmission strategy of the data analyzer 120 can be influenced by entries in the header 510 and/or in the data part 520 and/or by the lengths 501 and/or 521.

FIG. 4 shows a schematic depiction of part of a table 550 according to a further embodiment of the present invention. The table has rows 551, 552, 553, 554 as an example. Each of the table rows 551, 552, 553, 554 has the entries characterization 560, assignment 561, whitelist 562, priority 563 and maximum load 564. An embodiment of the present invention can comprise these entries, only part of these entries or also additional entries.

The characterization 560 can comprise the determination of a data type. Examples of a data type can be: control information for the vehicle and/or an actuator, control information for a device such as a telephone, raw sensor data, infotainment data, audio data, video data. The characterization 560 can also be used, for example, as a key for an associative memory.

The assignment 561 can be an assignment to one of the buffer stores and/or to one of the second interface controllers. One, multiple instances or none of the buffer stores and/or one of the second interface controllers can be addressed. The entry "0" can be provided if, for example, a data packet 500 having a predefined data type 560 is supposed to be rejected in any case. The assignment 561 can, for example, be used advantageously when video data and telephone data, for example, are supposed to be quickly sorted and assigned to the applicable devices.

The whitelist 562 can have specific permissible addresses, for example MAC addresses or features of higher protocol layers. The whitelist 562 can be empty.

The priority 563 can be allocated, for example, on the basis of a characterization 560 or also, for example, stipulated by a definition in the configuration module 200 (see FIGS. 1 and 2). For example, sensor data can be assigned a higher priority than music data, for example. Depending on this, predefined types of data can be treated preferentially.

The maximum load 564 can relate to the communication medium of the first interface controller 110, for example. For example, the maximum load from which a specific data packet 500 is refused or rejected can be defined.

Figure 5:
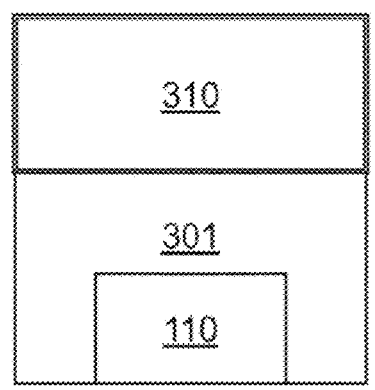
FIG. 5: shows a schematic depiction of a controller in a vehicle according to an embodiment of the present invention.

FIG. 5 shows a schematic depiction of a controller 310, 320, 330 in a vehicle according to an embodiment of the present invention. The controller has a first interface controller 110 that is directly connected to a second interface controller 301, 302, 303 and a vehicle controller 310, 320, 330.

Figure 6:
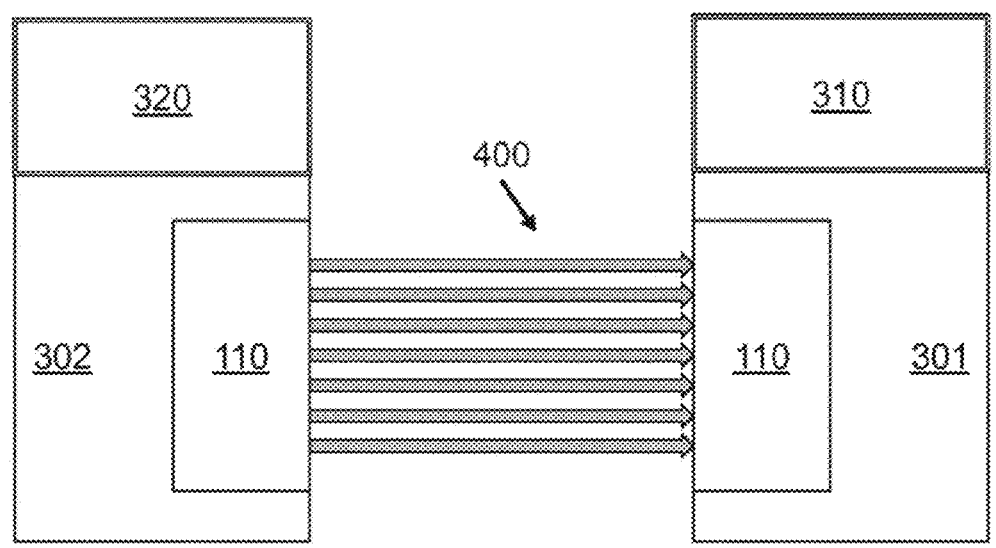
FIG. 6: shows a schematic depiction of a communication with many communication connections according to an embodiment of the present invention.

FIG. 6 shows a schematic depiction of a communication with many communication connections 400 according to an embodiment of the present invention. This can overload some of the interface controllers 110.

Figure 7:
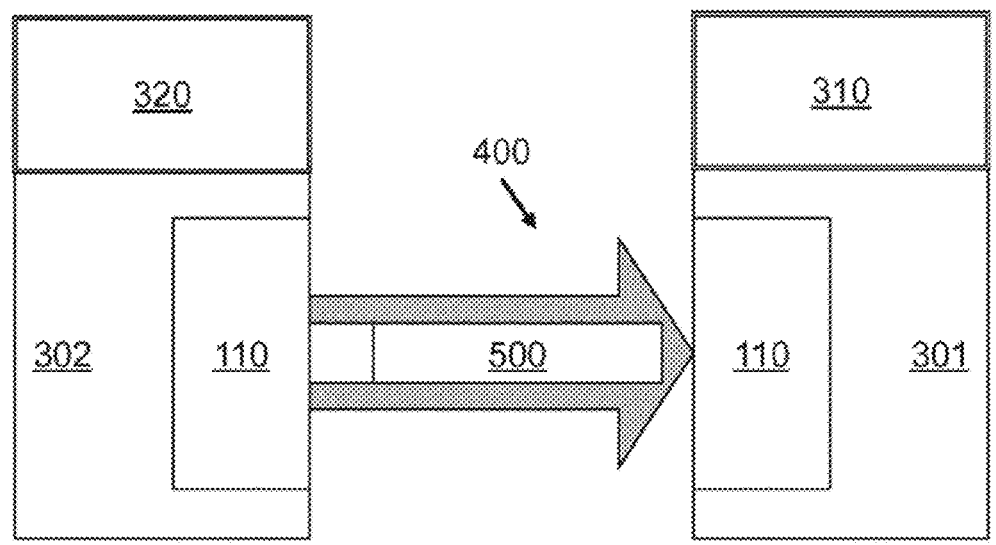
FIG. 7: shows a schematic depiction of a large data packet on a communication connection according to an embodiment of the present invention.

FIG. 7 shows a schematic depiction of a large data packet 500 on a communication connection 400 according to an embodiment of the present invention. For some of the interface controllers 110, this can exceed the maximum input buffer.

Figure 8:
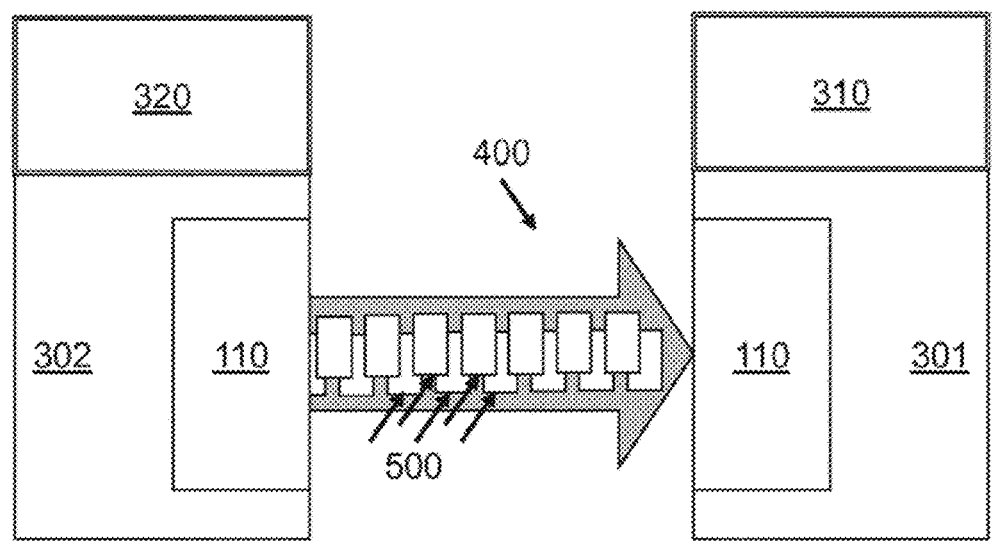
FIG. 8: shows a schematic depiction of a large amount of data per unit time on a communication connection according to an embodiment of the present invention.

FIG. 8 shows a schematic depiction of a large number of data packets 500 per unit time on a communication connection 400 according to an embodiment of the present invention. For some of the interface controllers 110, this can exceed the maximum capacity. This can be triggered, for example, by a so-called DoS attack.

Figure 9:
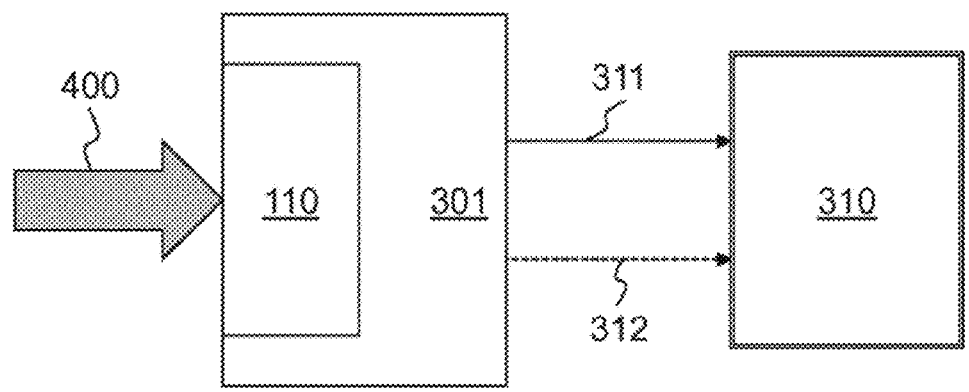
FIG. 9: shows a schematic depiction of a first and a second interface controller according to an embodiment of the present invention.

FIG. 9 shows a schematic depiction of a first 110 and a second 301, 302, 303 interface controller according to an embodiment of the present invention. The CPU is informed of every incoming frame and can thus interrupt tasks in progress. Ethernet frames can possibly be rejected, and paused tasks cannot be processed in a timely manner. The present invention can reduce these effects. In some embodiments, the vehicle electrical system communication can be configured statically to reduce these effects. Ethernet can send data both by unicast and by multicast and broadcast. Occasionally this addressing is not fixed because switches can change the recipient address in the event of an error. For example, if a recipient can no longer be reached, the switch may be able to forward a data stream addressed with unicast to all controllers. Multicast and broadcast communication cannot be avoided in general, because otherwise protocols such as ARP (Address Resolution Protocol) or IEEE 802.1AS could no longer work.

The use of Ethernet and IP in the vehicle can be improved by the methods and/or apparatuses described. The type of communication (client/server) that accompanies Ethernet may be novel for at least some vehicles. The Ethernet communication and/or specifications of newer vehicle controllers can already lead to high bus utilization. In some embodiments, so-called network cards can be used, for example. With such components, the controller and the transceiver are integrated on a separate system and thus decoupled from the main system.

Figure 10:
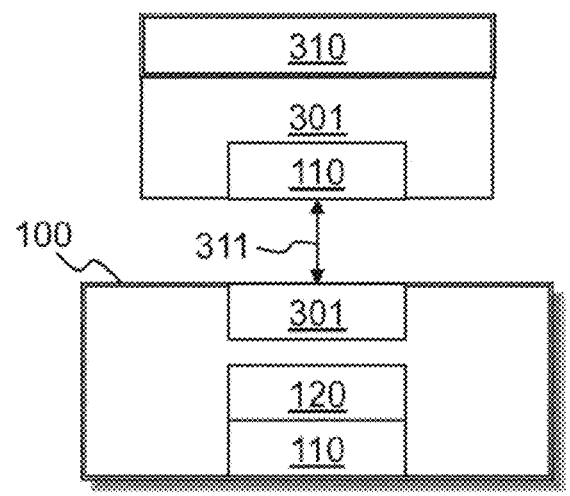
FIG. 10: shows a schematic depiction of an embodiment of the present invention.

FIG. 10 shows a schematic depiction of an embodiment of the present invention. A control unit 100 is inserted between the connection, for example an Ethernet connection. In this way, instead of or in addition to other measures, the problems as depicted in FIGS. 6 to 8 can be alleviated at least in part.

The vehicle controller 310, 320, 330, for example a microcontroller (μC) or microprocessor (μP) or a system on chip (SoC), has hardware having Ethernet interfaces transparently connected upstream of it. In this context, transparent means that no protocol conversion has to take place and that the hardware can also be presented almost invisibly to the application. The hardware can have two Ethernet interfaces, for example, which in one embodiment provide the same speed as that of the μC. In addition to this, the additional component provides a fast configuration interface 220 that is not routed via Ethernet. The hardware can be connected either to the circuit board (OnBoard) or via a cable to the μC (or the PHY). The HW does not necessarily have to be placed on the same circuit board. It can be useful to provide a separate configuration line 220. The additional hardware can be realized as an intelligent 2-port Ethernet switch module, for example. The additional hardware can also be realized as an ASIC, for example with memory and two Ethernet interfaces—in the ASIC or outside. The hardware can be designed, for example, as such an ASIC including registers and 2 Ethernet PHYs.

Figure 11:
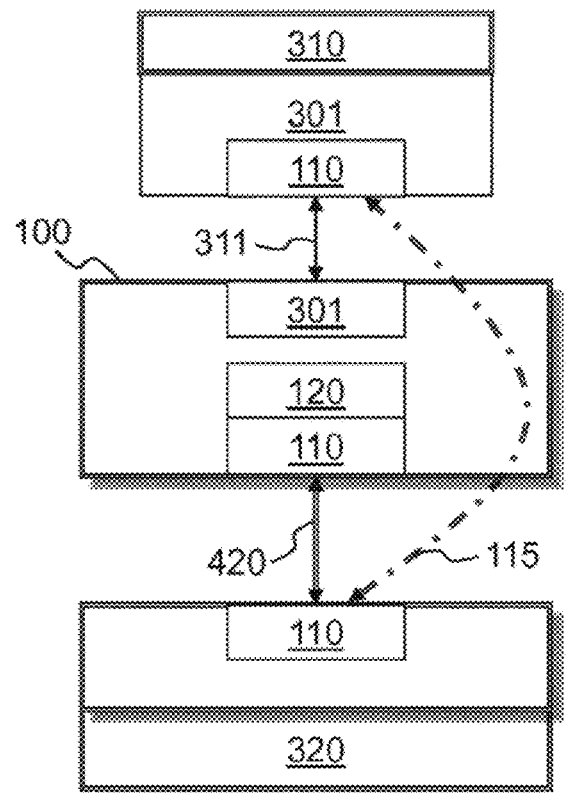
FIG. 11: shows a schematic depiction of an embodiment of the present invention.

FIG. 11 shows a schematic depiction of an embodiment of the present invention. Addressing that is transparent in some respects (since neither ECU1 nor ECU2 sees an address of this component, either as recipient or as sender) may be possible in this case. This is depicted schematically in FIG. 11 by a bidirectional arrow 115. This can become possible if the additional hardware is no longer addressed and/or supposed to be addressed. This means that it does not work on layer 2, but rather externally only on the physical layer.

Figure 12:
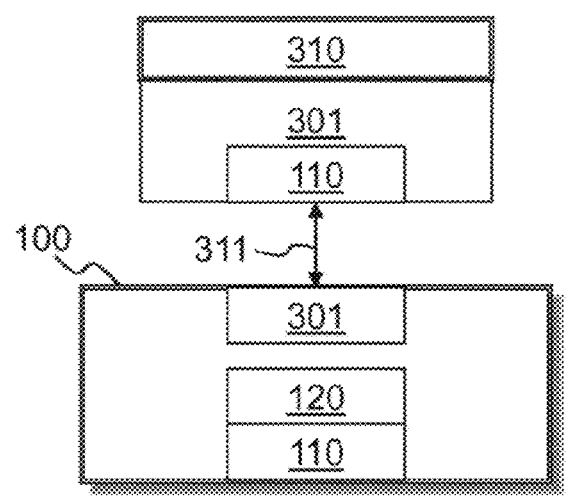
FIG. 12: shows a schematic depiction of an embodiment of the present invention.

FIG. 12 shows a schematic depiction of an embodiment of the present invention. This is an embodiment in which the HW mediates between two different speeds. This allows a missing interface of the microcontroller to be compensated for and this idea to be used more widely. Here, the hardware can additionally be equipped with additional memory in order to temporarily store the high-frequency packets before they are forwarded using a slower connection.

Figure 13:
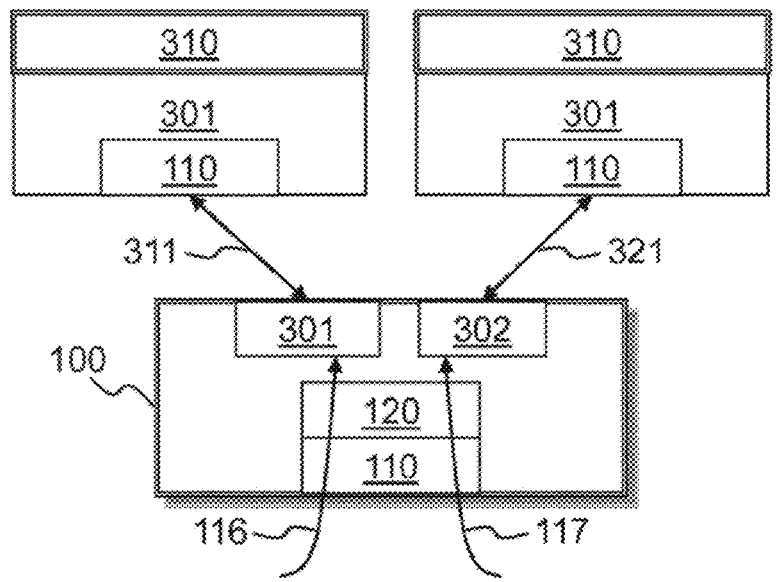
FIG. 13: shows a schematic depiction of an embodiment of the present invention.

FIG. 13 shows a schematic depiction of an embodiment of the present invention. In this case, no priority 563 is allocated, which means that the data streams 116 and 117 have the same priority.

Figure 14:
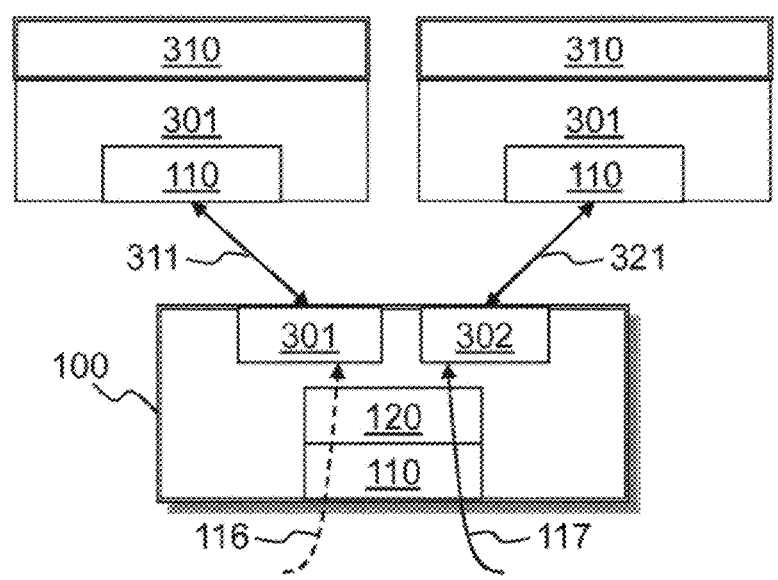
FIG. 14: shows a schematic depiction of an embodiment of the present invention.

FIG. 14 shows a schematic depiction of an embodiment of the present invention. For example, after a software update, the data streams 116 and 117 and the software can be assigned new priorities 563. In the embodiment depicted, the data stream 117 has a higher priority than the data stream 117. This can be used, for example, to provide control data of the vehicle that arrive as a data stream 117 with higher priority than an infotainment data stream 116. The invention makes it possible to use the upstream hardware, independently of the vehicle network, to make a decision and to provide arriving sensor data (in data stream 117) with higher or more important priority and, for example, to give them preference over music data (and then to send the latter with a delay). This hardware could then be configured dynamically, for example by means of the configuration module 200 (see FIG. 1 and/or 2). It could even be configured by another subscriber in the network, i.e. another ECU or even from the backend. That is to say that the "Config" interface 220 can also be embodied as a bus or network.

Figure 15:
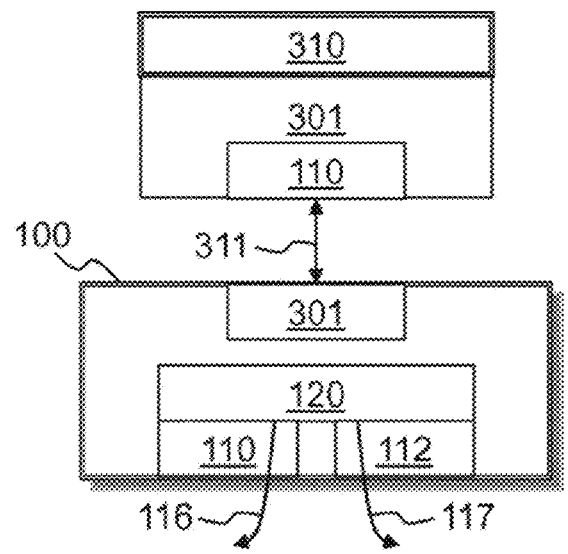
FIG. 15: shows a schematic depiction of an embodiment of the present invention.

FIG. 15 shows a schematic depiction of an embodiment of the present invention. In this case, two interfaces 110, 112, via which data streams 116 and 117 are routed, are arranged on a conventional controller. These data streams can be operated or configured redundantly, for example.

Figure 16:
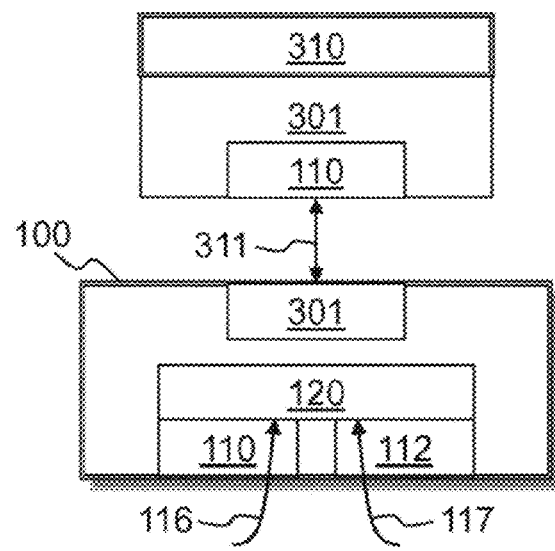
FIG. 16: shows a schematic depiction of an embodiment of the present invention.

FIG. 16 shows a schematic depiction of an embodiment of the present invention. In this case, two interfaces 110, 112, via which data streams 116 and 117 are routed, are arranged on a conventional controller. These data streams can be operated or configured redundantly, for example.

LIST OF REFERENCE SIGNS 100 control unit
110 first interface controller
112 further first interface controller
115 arrow
116, 117 data streams
120 header analysis
120 data analyzer
131, 132 buffer store
139 intermediate buffer for data packets
190 control system
200 configuration module
250 logging module
301, 302, 303 second interface controller
310, 320, 330 vehicle controller
311, 321, 331 data connection
312, 322, 332 interrupt connection
400 Ethernet connection
420 Ethernet connection
500 data packet
550 table
551, 552, 553, 554 table rows
560 characterization
561 assignment
562 whitelist
563 priority
564 maximum load

The invention claimed is:

1. A method for transmitting a data packet from a first interface controller to at least one second interface controller, the method comprising:

receiving the data packet by the first interface controller;
determining, by a data analyzer, a transmission strategy for the data packet, the transmission strategy comprising at least one of the following actions:
  i. fusing a maximum load for the data packet, wherein the maximum load for the data packet is a maximum number of packets per unit time for a data type of the data packet,
  ii. rejecting data packets that exceed the maximum number of packets per unit time for the data type of the data packet,
  iii. sending the data packets that exceed the maximum number of packets per unit time for the data type of the data packet to at least one buffer store,
  iv. fragmenting the data packets that exceed the maximum number of packets per unit time for the data type of the data packet and sending the data packets that exceed the maximum number of packets per unit time for the data type of the data packet to the at least one buffer store, and
  v. sending the content of the at least one buffer store to the first interface controller based on the data type of the data packet; and
implementing the transmission strategy for the data packet.

2. The method as claimed in claim 1,
wherein the transmission strategy further comprises at least one of the following actions:
  using a characterization for the data packet;
  using an assignment to one of the at least one buffer store (and/or to one of the second interface controllers for the data packet;
  using a whitelist for the data packet;
  using a priority for the data packet,
  wherein the maximum load:
    is a load on a communication connection of the first interface controller and/or of the second interface controller; or
    is defined depending on a sender.

3. The method as claimed in claim 1,
wherein at least part of the transmission strategy is presented in a table.

4. The method as claimed in claim 3,
wherein the table is formed as an associative memory, a characterization for the data packet being used as a key for the associative memory.

5. The method as claimed in claim 3, wherein the transmission strategy further comprises the following action:
  reading in the table from a configuration module.

6. The method as claimed in claim 3, wherein the table comprises the data type of the data packet, elements of a whitelist for the data packet, a priority for the data packet, or the maximum load for the data packet.

7. The method as claimed in claim 6, wherein the data type of the data packet comprises at least one of control information for a vehicle or an actuator, control information for an external device, raw sensor data, infotainment data, audio data, or video data.

8. The method as claimed in claim 1, wherein the transmission strategy further comprises the following action:
  sending at least part of the data packet to a logging module.

9. The method as claimed in claim 1,
wherein the first interface controller supports an Ethernet protocol, and
the second interface controller supports a parallel bus protocol, a serial bus protocol and/or an Ethernet protocol.

10. The method as claimed in claim 1, further comprising a further first interface controller,
wherein the further first interface controller supports the same protocol as the first interface controller.

11. The method as claimed in claim 10,
wherein the further first interface controller is used as a redundant first interface controller.

12. A method as claimed in claim 1 for transmitting a data packet between controller modules in a vehicle.

13. A method for transmitting a data packet from at least one second interface controller to a first interface controller, the method comprising:
receiving the data packet by the at least one second interface controller;
determining, by a data analyzer, a transmission strategy for the data packet, the transmission strategy comprising at least one of the following actions:
  i) using a maximum load for the data packet, wherein the maximum load for the data packet is a maximum number of packets per unit time for a data type,
  ii) rejecting data packets that exceed the maximum number of packets per unit time for the data type of the data packet,
  iii) sending the data packets that exceed the maximum number of packets per unit time for the data type of the data packet to at least one buffer store,
  iv) fragmenting the data packets that exceed the maximum number of packets per unit time for the data type of the data packet and sending the data packets that exceed the maximum number of packets per unit time for the data type of the data packet to the at least one buffer store, and
  v) sending the content of the at least one buffer store to the first interface controller based on the data type of the data packet; and
implementing the transmission strategy for the data packet.

14. The method as claimed in claim 13,
wherein the transmission strategy further comprises at least one of the following actions:
  using a characterization for the data packet;
  using an assignment to one of the at least one buffer store and/or to one of the second interface controllers for the data packet;
  using a whitelist for the data packet;
  using a priority for the data packet,
  wherein the maximum load:
    is a load on a communication connection of the first interface controller and/or of the second interface controller; or
    is defined depending on a sender.

15. A control unit for transmitting a data packet from a first interface controller to at least one second interface controller and/or for transmitting a data packet from at least one second interface controller to a first interface controller, the control unit comprising:
the first interface controller, a data analyzer, at least one buffer store, and at least one second interface controller,
wherein the control unit is configured to: determine, by the data analyzer, a transmission strategy for the data packet, the transmission strategy comprising at least one of the following actions:

i) using a maximum load for the data packet, wherein the maximum load for the data packet is a maximum number of packets per unit time for a data type,
ii) rejecting data packets that exceed the maximum number of packets per unit time for the data type of the data packet,
iii) sending the data packets that exceed the maximum number of packets per unit time for the data type of the data packet to at least one buffer store,
iv) fragmenting the data packets that exceed the maximum number of packets per unit time for the data type of the data packet and sending the data packets that exceed the maximum number of packets per unit time for the data type of the data packet to the at least one buffer store, and
v) sending the content of the at least one buffer store to the first interface controller based on the data type of the data packet; and
implementing the transmission strategy for the data packet.

16. The control unit as claimed in claim 15, wherein the control unit is implemented as an Application-Specific Integrated Circuit (ASIC) or as a Field Programmable Gate Arrays (FPGA).

17. A control system for transmitting a data packet from a first interface controller to at least one second interface controller and/or for transmitting a data packet from at least one second interface controller to a first interface controller, the control system having:
the control unit as claimed in claim 15,
a configuration module, wherein the control unit is set up to read in a table from the configuration module, and/or
a logging module, wherein the control unit is set up to send at least part of the data packet to the logging module.

18. The control system as claimed in claim 17 for transmitting a data packet between controller modules in a vehicle.

19. The control unit as claimed in claim 15, for transmitting a data packet between controller modules in a vehicle.

20. A vehicle having a control unit for transmitting a data packet from a first interface controller to at least one second interface controller and/or for transmitting a data packet from at least one second interface controller to a first interface controller, the control unit comprising:
the first interface controller, a data analyzer, at least one buffer store, and the at least one second interface controller, wherein the control unit is configured to:
determine, by a data analyzer, a transmission strategy for the data packet, the transmission strategy comprising at least one of the following actions:
i) using a maximum load for the data packet, wherein the maximum load for the data packet is a maximum number of packets per unit time for a data type,
ii) rejecting data packets that exceed the maximum number of packets per unit time for the data type of the data packet,
iii) sending the data packets that exceed the maximum number of packets per unit time for the data type of the data packet to at least one buffer store,
iv) fragmenting the data packets that exceed the maximum number of packets per unit time for the data type of the data packet and sending the data packets that exceed the maximum number of packets per unit time for the data type of the data packet to the at least one buffer store, and
v) sending the content of the at least one buffer store to the first interface controller based on the data type of the data packet; and
implementing the transmission strategy for the data packet.

\* \* \* \* \*

UNITED STATES PATENT AND TRADEMARK OFFICE
CERTIFICATE OF CORRECTION

PATENT NO. : 11,902,048 B2
APPLICATION NO. : 17/291140
DATED : February 13, 2024
INVENTOR(S) : Helge Zinner Page 1 of 1

It is certified that error appears in the above-identified patent and that said Letters Patent is hereby corrected as shown below:

In the Claims

Column 13, Line 5, Claim 1, "fusing" should read -- using --.

Column 13, Line 32, Claim 2, "(and/or" should be -- and/or --.

Column 15, Line 20, Claim 15, "implementing" should be -- implement --.

Column 16, Line 34, Claim 20, "implementing" should be -- implement --.

Signed and Sealed this
First Day of October, 2024

Katherine Kelly Vidal
*Director of the United States Patent and Trademark Office*